United States Patent
Chiga et al.

(10) Patent No.: US 8,221,848 B2
(45) Date of Patent: Jul. 17, 2012

(54) METHOD FOR MAKING MULTILAYER COATING FILM

(75) Inventors: Koki Chiga, Hiratsuka (JP); Tooru Fukuda, Hiratsuka (JP); Toshiaki Nagano, Hiratsuka (JP); Hideo Sugai, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 1160 days.

(21) Appl. No.: 12/073,975

(22) Filed: Mar. 12, 2008

(65) Prior Publication Data

US 2008/0226891 A1    Sep. 18, 2008

(30) Foreign Application Priority Data

Mar. 12, 2007 (JP) .................................. 2007-61430

(51) Int. Cl.
*B05D 7/00* (2006.01)

(52) U.S. Cl. ...................... 427/409; 427/407.1; 427/331; 427/355; 428/172; 428/412; 428/423.1; 428/480

(58) Field of Classification Search .................. 427/379, 427/385.5, 407.1, 409, 331, 355; 428/172, 428/412, 423.1, 480
See application file for complete search history.

(56) References Cited

U.S. PATENT DOCUMENTS

| | | | |
|---|---|---|---|
| 4,053,076 A | | 10/1977 | Vogel et al. |
| 6,472,020 B1 * | | 10/2002 | Yoshioka et al. ........... 427/407.1 |
| 2004/0191418 A1 * | | 9/2004 | Suwama et al. ........... 427/372.2 |

FOREIGN PATENT DOCUMENTS

| | | |
|---|---|---|
| JP | 6-220397 | 8/1994 |
| JP | 10-272414 | 10/1998 |

OTHER PUBLICATIONS

Machine translation of JP 10-272414.*

* cited by examiner

*Primary Examiner* — Mark Kopec
*Assistant Examiner* — Haidung Nguyen
(74) *Attorney, Agent, or Firm* — Wenderoth, Lind & Ponack, L.L.P.

(57) ABSTRACT

This invention provides a multilayer coating film-forming method which comprises applying a first clear paint onto a coating object, applying onto so formed first clear coating film which is either uncured or cured by heating, a second clear paint such that its heat-cured film thickness falls within a range of 2-15 μm, and forming the second clear coating film, (a) the first clear paint and second clear paint comprising hydroxyl-containing resin as the base resin and polyisocyanate compound as the crosslinking agent, and (b) when the coating film formed by applying a paint to a cured film thickness of 40 μm and curing it by heating at 140° C. for 30 minutes is measured of its dynamic viscoelasticity at a frequency of 11 Hz, the first clear paint forming the first clear coating film having a glass transition temperature of lower than 70° C. and tanδ (=loss elastic modulus/storage elastic modulus) at 80° C. of less than 0.4, and the second clear paint forming the second clear coating film having a glass transition temperature of at least 70° C.

22 Claims, No Drawings

METHOD FOR MAKING MULTILAYER COATING FILM

TECHNICAL FIELD

This invention relates to a method for making multilayer coating film excelling in scratch resistance, acid resistance and stain resistance.

BACKGROUND ART

Coating to be applied onto coating objects such as car bodies is required to form coating film of excellent performance such as scratch resistance, acid resistance, stain resistance and finished appearance.

Conventionally, melamine crosslinking coating is generally used as paint for coating objects such as car bodies. Melamine crosslinking coating is a paint which contains hydroxyl-containing resin as the base resin and melamine resin as the crosslinking agent, and shows high crosslinking density when cured by heating and excels in coating film performance such as scratch resistance and finished appearance. The coating film formed from the paint, however, has a defect that the melamine crosslinkage is easily hydrolyzed by acid rain and hence the film is inferior in acid resistance.

As a paint capable of forming a coating film superior in both acid resistance and scratch resistance, for example, JP Hei 6 (1994)-220397A discloses a two package type urethane crosslinking paint composition comprising hydroxyl-containing acrylic resin, hydroxyl-containing oligoester and isocyanate prepolymer. The coating film formed of this paint excels in acid resistance because urethane-crosslinkage is difficult to be hydrolyzed, but has a problem that its scratch resistance is insufficient.

Also JP Hei 10 (1998)-272414A discloses a hard top coating film-forming method by 3-coat-2-bake system, as a method for forming a top coat multilayer coating film excelling in acid rain resistance, scratch resistance, pollen soiling resistance and the like, which comprises successively applying a coloring paint and a first clear paint, heating to simultaneously cure the two coating films, thereafter applying onto the coated surface a second clear paint containing a hydrolyzate of specific silicon compound, and heating and curing the same. According to this coating film-forming method, hard coating film can be obtained by suitably selecting the hydrolyzate of silicon compound, but the coating film has insufficient scratch resistance and weatherability.

DISCLOSURE OF THE INVENTION

The object of the present invention is to provide a multilayer coating film-forming method which can form coating film excellent in all of scratch resistance, stain resistance, acid resistance and finished appearance.

We noticed the relevancy of dynamic viscoelasticity of coating film particularly to restoration of scratches and made concentrative studies to now come to discover that the above object could be accomplished by a two-layered multilayer urethane-crosslinked coating film using clear paints comprising hydroxyl-containing resin and polyisocyanate compound, in which tan $\delta$ of the lower layer coating film and glass transition temperature of the upper layer coating film are adjusted to fall in specific ranges, and the upper layer is applied to form a thin film. This invention is whereupon completed.

Thus, the present invention provides a method for forming multilayer coating film, characterized by comprising applying a first clear paint onto a coating object, applying onto so formed first clear coating film which is either uncured or cured by heating, a second clear paint such that its heat-cured film thickness falls within a range of 2-15 μm, and forming the second clear coating film, (a) the first clear paint and second clear paint comprising hydroxyl-containing resin as the base resin and polyisocyanate compound as the crosslinking agent, and (b) when the coating film formed by applying a paint to a cured film thickness of 40 μm and curing it by heating at 140° C. for 30 minutes is measured of its dynamic viscoelasticity at a frequency of 11 Hz, the first clear paint forming the first clear coating film having a glass transition temperature of lower than 70° C. and tan $\delta$ (=loss elastic modulus/storage elastic modulus) at 80° C. of less than 0.4, and the second clear paint forming the second clear coating film having a glass transition temperature of at least 70° C.

The main characteristic features of the multilayer coating film-forming method of the present invention are: in respect of dynamic viscoelasticity of the multilayer cured coating film formed, to use a first clear paint which forms the lower layer coating film having a glass transition temperature lower than the specified value and a tan $\delta$ (loss elastic modulus/storage elastic modulus) at the specified temperature which is less than the specified value, and to use a second clear paint which forms the upper layer coating film having a glass transition temperature not lower than the specified value, whereby forming a urethane-crosslinked multilayer coating film in which the lower layer is a soft elastic coating film and the upper layer is a thin, hard coating film excelling in stain resistance. Formation of such a urethane-crosslinked multilayer coating film composed of the two layers having different film properties of a lower soft elastic coating film and an upper thin, hard coating film according to the invention enables scratch resistance and stain resistance of the multilayer coating film to be compatible and to form a coating film excelling also in other aspects including acid resistance and finished appearance.

Hereinafter the multilayer coating film-forming method of the invention is explained in further details.

Coating Objects

The coating objects to which the multilayer coating film-forming method of the invention (hereafter occasionally referred to as "the present method") is applicable are not particularly limited, and, for example, sheet steel such as cold-rolled sheet steel, zinc-plated sheet steel, zinc alloy-plated sheet steel, stainless steel sheet and tin-plated sheet steel; metal substrates such as aluminum plate and aluminum alloy plate; and various plastic materials can be used. They may also be bodies of various vehicles such as automobiles, two-wheeled vehicles and container cars formed thereof.

The coating objects may also be metallic surfaces of metal substrates or of car bodies, which have been given a surface treatment such as phosphate treatment, chromate treatment or complex oxide treatment.

To these coating objects, preferably an undercoating (e.g., cationic electrodeposition coating) is applied in advance and depending on the occasion, further coating such as intermediate coating may be applied where necessary.

Coloring paint or the like may also be applied on the undercoated or intermediate coated surface of the coating object. The coating film formed by application of the color paint or the like may be cured or uncured, while it is preferred from the viewpoint of reducing the heat-curing steps to apply the present method to uncured coating film and concurrently cure the coating film formed by application of the color paint, when heat-curing the clear coating film of the present method.

The coating object may be one on which cured or uncured coating film of ordinary clear paint is formed in advance.

Specific examples of the coloring paint include solid color paint, metallic paint and iridescent paint. In particular, liquid thermosetting paint containing resin component, pigment and, where necessary, organic solvent or water which is a volatile component is suitable.

More specifically, the resin component comprises at least one base resin selected from acrylic resin, vinyl resin, polyester resin, alkyd resin, urethane resin and the like, which have crosslinkable functional groups (e.g., hydroxyl, epoxy, carboxyl, alkoxysilyl or the like) and crosslinking agent for crosslinking such base resin, for example, at least one crosslinking agent known in the field of paint, selected from alkyletherified melanine resin, urea resin, guanamine resin, optionally blocked polyisocyanate compound, epoxy compound, carboxyl-containing compound and the like. Based on the combined mass of the base resin and crosslinking agent, it is preferred that the base resin is used normally at a ratio of 50-90 mass % and the crosslinking agent, normally 50-10 mass %.

The pigment includes coloring pigment, metallic pigment and iridescent pigment. As examples of coloring pigment, inorganic pigment such as titanium dioxide, zinc flower, Carbon Black, Cadmium Red, Molybdate Red, chrome yellow, chromium oxide, Prussian blue and Cobalt Blue; and organic pigment such as azo pigment, phthalocyanine pigment, quinacridone pigment, isoindoline pigment, vat pigment and perylene pigment can be named. As the metallic pigment, aluminum flakes are the typical, and also special vapor-deposited metal film flakes or glass flakes are included. Examples of iridescent pigment include mica, mica with its surface coaled with metal oxide, micaceous iron oxide, hologram pigment and the like. These can be used either alone or in combination of two or more.

Coating of such coloring pigment on either directly on metallic and/or plastic coating object such as outer panels of automobiles, or on undercoat applied thereon such as of cationic electrocoating paint or the like or on an intermediate coat further applied thereon and cured, can be carried out by adjusting viscosity of such coloring pigment to 15-60 seconds with Ford cup viscosimeter No. 4 at 20° C. and applying it by such coating method as airless spray, air spray, rotary atomizing coating or the like. In the occasion of the coating, static electricity may be applied, where necessary.

The coating film thickness of the coloring pigment can be within a range of, as that of cured film, normally 5-50 μm, preferably 10-30 μm.

Curing of the coating film can be effected, while differing depending on the resin component used, by heating normally at about 80-about 180° C., preferably at about 100-about 160° C., for about 10-40 minutes.

Preceding the curing by heating, or preceding the application of the present method to the uncured coating film, a preheating at temperatures of, e.g. about 50-about 80° C. for about 3-10 minutes may be given to promote volatilization of volatile component, where necessary.

The First Clear Paint

The first clear paint used for the multilayer coating film-forming method of the present invention comprises hydroxyl-containing resin and polyisocyanate compound, which forms a coating film having a glass transition temperature lower than 70° C. and tan δ at 80° C. is less than 0.4, when the paint is applied and cured by heating at 140° C. for 30 minutes to form the first clear coating film of 40 μm in cured thickness, and the film's dynamic viscoelasticity is measured at a frequency of 11 Hz, the glass transition temperature being the temperature at which the tan δ (loss elastic modulus/storage elastic modulus) becomes the maximum.

The first clear paint is for forming a coating film layer which functions to restore damages on the multilayer coating film, as the lower layer soft elastic coating film in the multilayer coating film formed by the present method.

Any paint can be used as the first clear paint, so long as it comprises hydroxyl-containing resin and polyisocyanate compound and is capable of forming a coating film satisfying the above dynamic viscoelasticity requirements, without any particular limitation. As the hydroxyl-containing resin and polyisocyanate compound that can be contained in the paint, the following can be named.

Examples of hydroxyl-containing resin include hydroxyl-containing acrylic resin, hydroxyl-containing polyester resin, hydroxyl-containing polyether resin, hydroxyl-containing polycarbonate resin, hydroxyl-containing polyurethane resin and the like. Of these, hydroxyl-containing acrylic resin and hydroxyl-containing polyester resin are preferred. Those hydroxyl-containing resins can be used either alone or in combination of two or more.

Hydroxyl-containing acrylic resin can be prepared by copolymerizing hydroxyl-containing vinyl monomer (M-1) with other copolymerizable vinyl monomer (M-2) by customarily practiced method.

Hydroxyl-containing vinyl monomer (M-1) is a compound containing at least one each of hydroxyl group and polymerizable unsaturated bond per molecule, and the hydroxyl group mainly acts as the functional group to react with a crosslinking agent. As the monomer (M-1), monoesterified products of (meth)acrylic acid with $C_{2-10}$ dihydric alcohols are preferred, examples of which include 2-hydroxyethyl(meth)acrylate, 2-hydroxypropyl(meth)acrylate, 4-hydroxybutyl(meth)acrylate and the like. Also as the monomer (M-1), monoesterified products of compounds obtained by ring-opening polymerization of ε-caprolactone with (meth)acrylic acid, for example, PLACCEL FA-1, PLACCEL FA-2, PLACCEL FA-3, PLACCEL FA-4, PLACCEL FA-5, PLACCEL FM-1, PLACCEL FM-2, PLACCEL FM-3, PLACCEL FM-4, PLACCEL FM-5 (tradename, PLACCEL Series monomers, Daicel Chemical Industries, Ltd.) can be named. These hydroxyl-containing vinyl monomers (M-1) can be used each alone or in combination of two or more. The term, "(meth) acrylic acid", as used in this specification means acrylic acid or methacrylic acid, and "(meth)acrylate", acrylate or methacrylate.

Other copolymerizable vinyl monomers (M-2) are the compounds other than the above hydroxyl-containing vinyl monomer (M-1), which have at least one polymerizable unsaturated bond per molecule, specific examples of which include monomers of the following (1)-(7) groups.

(1) Acid group-containing polymerizable unsaturated monomers: compounds having at least one acid group and one polymerizable unsaturated bond per molecule, for example, carboxyl-containing unsaturated monomers such as (meth)acrylic acid, crotonic acid, itaconic acid, maleic acid and maleic anhydride; sulfonic acid group-containing unsaturated monomers such as vinylsulfonic acid and sulfoethyl (meth)acrylate; and acidic phosphoric acid ester type unsaturated monomers such as 2-(meth)acryloyloxyethyl acid phosphate, 2-(meth)acryloyloxypropyl acid phosphate, 2-(meth)acryloyloxy-3-chloropropyl acid phosphate and 2-methacryloyloxyethylphenylphosphoric acid. These can be used each alone or in combination of two or more. The above acid group-containing polymerizable unsaturated monomers can also act as internal catalyst in the occasion of crosslinking reaction of the hydroxyl-containing resin with crosslinking agent, and its use rate is preferably within a range of normally 0.1-5 mass %, in particular, 0.1-3 mass %, based on the total amount of the monomeric mixture constituting the hydroxyl-containing acrylic resin.

(2) Monoesterified products of (meth)acrylic acid with $C_{1-20}$ monohydric alcohol: for example, methyl(meth)acrylate, ethyl(meth)acrylate, propyl(meth)acrylate, n-butyl(meth)acrylate, iso-butyl(meth)acrylate, tert-butyl(meth)acrylate, 2-ethylhexyl(meth)acrylate, cyclohexyl(meth)acrylate, lauryl(meth)acrylate, isobornyl(meth)acrylate, tridecyl(meth)acrylate, and stearyl(meth)acrylate.

(3) Aromatic vinyl monomers: for example, styrene, α-methylstyrene and vinyltoluene.

(4) Glycidyl-containing vinyl monomers: compounds containing at least one each of glycidyl group and polymerizable unsaturated bond per molecule, for example, glycidyl(meth)acrylate.

(5) Polymerizable unsaturated bond-containing amide compounds: for example acrylamide, dimethylacrylamide, N,N-dimethylpropyl acrylamide, N-butoxymethyl acrylamide, N-methylol(meth)acrylamide and diacetonacrylamide.

(6) Polymerizable unsaturated bond-containing nitrile compounds: for example, (meth)acrylonitrile.

(7) Other polymerizable unsaturated compounds: for example, vinyl acetate, vinyl propionate, vinyl chloride, versatic acid vinyl esters such as Veo Va 9 and Veo Va 10 (tradename, Japan Epoxy Resin Co.), allyl ethers, and vinyl alcohols.

These other vinyl monomers (M-2) can be used either alone or in combination of two or more.

The hydroxyl-containing acrylic resin preferably has a hydroxyl value within a range of generally 100-250 mgKOH/g, in particular, 120-200 mgKOH/g, inter alia, 130-170 mgKOH/g for favorable curability.

The hydroxyl-containing acrylic resin preferably also has an acid value within a range of generally 0-50 mgKOH/g, in particular, 0-35 mgKOH/g, inter alia, 0-25 mgKOH/g, for favorable pot life and curability.

The hydroxyl-containing acrylic resin preferably also has a number-average molecular weight within a range of generally 1,000-50,000, in particular, 1,250-40,000, inter alia, 1,500-30,000, for favorable finished appearance.

In the present specification, "number-average molecular weight" is a value calculated from a chromatogram measured with gel permeation chromatograph, based on the molecular weight of standard polystyrene, which can be measured using as the gel permeation chromatograph HLC8120GPC (tradename, Tosoh Corporation) and four columns of TSKgel G-4000HXL, TSKgel G-3000HXL, TSKgel G-2500-HXL and TSKgel G-2000HXL (tradenames, Tosoh Corporation), under the conditions of mobile phase; tetrahydrofuran, measuring temperature; 40° C., flow rate; 1 cc/min. and detecter; RI.

The hydroxyl-containing acrylic resin preferably has a relatively low glass transition temperature (Tg) of normally from −60° C. to 30° C., in particular, from −50° C. to 20° C., inter alia, from −40° C. to 10° C., from the viewpoint of rendering the tan δ at 80° C. of the first clear coating film of 40 μm in cured film thickness which is formed by applying and heat-curing the first clear paint, less than 0.4, when dynamic viscoelasticity of the film is measured at a frequency of 11 Hz.

Those hydroxyl-containing acrylic resins which form coating films having above preferred Tg range can be obtained, for example, by using as the above-explained monomer (M-1) hydroxyl-containing vinyl monomer having long chain hydroxyl-containing hydrocarbon, such as 4-hydroxybutyl (meth)acrylate or PLACCEL series monomers, e.g., PLAC-CEL FA-1, and as other vinyl monomer (M-2), soft monomer such as monoesterified products of (meth)acrylic acid with monohydric alcohol having long chain hydrocarbon group, such as 2-ethylhexyl(meth)acrylate, lauryl(meth)acrylate and stearyl(meth)acrylate.

Measurement of Glass Transition Temperature of the Resins

In the present specification, glass transition temperature (Tg) of each resin is a value measured with differential scanning calorimeter (DSC; SSC 5200, tradename, Seiko Instrument & Electronics Ltd.), based on the method specified by JISK 7121 (glass transition temperature measuring method for plastics), in an inert gas and at a temperature rise rate of 10° C./min. The measurement was carried out after measuring out a prescribed amount of a test specimen in a sample dish and drying it at 130° C. for 3 hours.

Hydroxyl-containing polyester resins can be prepared by per se known methods, for example, through esterification method of polybasic acid with polyhydric alcohol. Polybasic acid is a compound having at least two carboxyl groups per molecule, examples of which include phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid and anhydrides thereof. Polyhydric alcohol is a compound having at least two hydroxyl groups per molecule, examples of which include diols such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethylpentanediol and hydrogenated bisphenol A; at least trivalent polyol component such as trimethylolpropane, trimethylolethane, glycerine and pentaerythritol; and hydroxycarboxylic acids such as 2,2-dimethylolpropionic acid, 2,2-dimethylolbutanoic acid, 2,2-dimethylolpentanoic acid, 2,2-dimethylolhexanoic acid and 2,2-dimethyloloctanoic acid.

Introduction of hydroxy groups into a polyester resin can be effected by using a stoichiometrically excessive amount of polyhydric alcohol to polybasic acid in the above esterification reaction.

It is also possible to introduce monoepoxy compound such as an olefin, e.g., propylene oxide or butylene oxide with epoxy group-bonded terminal, CARDURA E10 (tradename, Japan Epoxy Resin Co., glycidyl ester of synthetic highly branched saturated fatty acid) into the polyester resin, by reaction of these compounds with the acid groups. Carboxyl groups may also be introduced by adding, for example, acid anhydride to the hydroxyl-containing polyester resin to effect half-esterification.

The hydroxyl-containing polyester resin preferably has a hydroxyl value within a range of generally 100-250 mgKOH/g, in particular, 120-200 mgKOH/g, inter alia, 130-170 mgKOH/g, in respect of curability.

Also in respect of pot life and curability, the hydroxyl-containing polyester resin preferably has an acid value within a range of generally 0.5-50 mgKOH/g, in particular, 0.75-35 mgKOH/g, inter alia, 1-25 mgKOH/g.

For favorable finished appearance, the hydroxyl-containing polyester resin preferably has a number-average molecular weight within a range of generally 1,500-100,000, in particular, 2,000-65,000, inter alia, 3,000-30,000.

The hydroxyl-containing polyester resin preferably has a relatively low glass transition temperature (Tg) of normally from −60° C. to 30° C., in particular, from −50° C. to 20° C., inter alia, from −40° C. to 10° C., from the viewpoint of rendering the tan δ at 80° C. of the first clear coating film of 40 μm in cured film thickness, formed by applying and heat-curing the first clear paint, less than 0.4, when dynamic viscoelasticity of the film is measured at a frequency of 11 Hz.

As polyisocyanate compound which is the crosslinking agent component in the first clear paint, those having at least two free isocyanate groups per molecule, which are heretofore used for preparation of polyurethane or the like, can be used. The isocyanate groups act as functional group to participate in crosslinkage and react mainly with hydroxyl groups in the hydroxyl-containing resin to produce urethane linkages. Specifically, as such polyisocyanate compound, aliphatic polyisocyanate, alicyclic polyisocyanate, aromatic-aliphatic polyisocyanate, aromatic polyisocyanate and derivatives of these polyisocyanates can be used.

Examples of the aliphatic polyisocyanate include aliphatic diisocyanates such as trimethylene diisocyanate, tetramethylene diisocyanate, hexamethylene diisocyanate, pentamethylene diisocyanate, 1,2-prophylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl caproate and the like; and aliphatic triisocyanates such as lysine ester triisocyanate, 1,4,8-triisocyanatooctane, 1,6,11-triisocyanatoundecane, 1,8-diisocyanato-4-isocyanatomethyloctane, 1,3,6-triisocyanatohexane, 2,5,7-trimethyl-1,8-diisocyanato-5-isocyanatomethyloctane and the like.

Examples of the alicyclic polyisocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis (cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or mixtures thereof, norbornane diisocyanate and the like; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1) heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1) heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, 6-(2-isocyanatoethyl)-2-isocyanatomethyl-2-(3-isocyanatopropyl)-bicyclo(2.2.1)heptane and the like.

Examples of the aromatic-aliphatic polyisocyanate include aromatic-aliphatic diisocyanates such as 1,3- or 1,4-xylylene diisocyanate or mixtures thereof, ω,ω'-diisocyanato-1,4-diethylbenzene, 1,3- or 1,4-bis(1-isocyanato-1-methylethyl)benzene (common name: tetramethylxylylene diisocyanate) or mixtures thereof; and aromoatic-aliphatic triisocyanates such as 1,3,5-triisocyanatomethylbenzene and the like.

Examples of the aromatic polyisocyanate include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, 4,4'-diphenylether diisocyanate and the like; aromatic triisocyanates such as triphenylmethane-4,4',4"-triisocyanate, 1,3,5-triisocyanatobenzene, 2,4,6-triisocyanatotoluene and the like; and aromatic tetraisocyanates such as diphenylmethane-2,2',5,5'-tetraisocyanate and the like.

Also as the polyisocyanate derivatives, for example, their dimers, trimers, biurets, allophanates, carbodiimides, urethodiones, urethoimines, isocyanurates, oxadiazintrione, polymethylene polyphenyl polyisocyanate (crude MDI, polymeric MDI), crude TDI and the like can be named.

These polyisocyanate compounds can be used either alone or in combination of two or more. Of these polyisocyanate compounds, aliphatic polyisocyanate, alicyclic polyisocyanate and derivatives of those polyisocyanates are preferred in respect of restorability of damages. The following polyisocyanate compounds are particularly preferred:

(1) polyisocyanate compound having soft skeleton, (2) polyisocyanate compound having soft chain structure at a part of the isocyanate skeleton, and (3) at least trifunctional polyisocyanate compound in which a soft structure component is bound to at least one of the functional group sites.

Specific examples of above type (1) polyisocyanate compound include aliphatic polyisocyanate such as hexamethylene diisocyanate, alicyclic polyisocyanate such as dicyclohexylmethane diisocyanate, or their modifications, specifically, SUMIDUR N-3300 (tradename, Sumika Bayer Urethane Co.) and the like. Also examples of the type (2) polyisocyanate compound include DURANATE E-402-90T, E-405-80-T (tradename, Asahi Kasei Chemicals Co.) and the like, and examples of the type (3) polyisocyanate compound include TAKENATE D-160N (tradename, Mitsui Chemicals Polyurethanes, Inc.) and the like.

As such polyisocyanate compound, blocked polyisocyanate compound may also be used. Blocked polyisocyanate compound is a polyisocyanate compound having at least two isocyanate groups per molecule, whose free isocyanate groups are blocked with a blocking agent.

The blocking agent dissociates from blocked polyisocyanate compound when the latter is heated to, for example, at least around 100° C., preferably at least around 130° C., to regenerate the isocyanate groups which can readily react with hydroxyl groups. Examples of the blocking agent include phenols such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, β-propiolactam and the like; aliphatic alcohols such as methanol, ethanol, propyl alcohol, butyl alcohol, amyl alcohol, lauryl alcohol and the like; ethers such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolic acid esters such as methyl glycolate, ethyl glycolate, butyl glycolate and the like; lactic acid; lactic acid esters such as methyl lactate, ethyl lactate, butyl lactate and the like; alcohols such as methylolurea, methylolmelamine, diacetone alcohol, 2-hydroxyethyl acrylate, 2-hydroxyethyl methacrylate and the like; oximes such as formamidoxime, acetamidoxime, acetoxime, methyl ethyl ketoxime, diacetylmonooxime, benzophenoneoxime, cyclohexane-oxime and the like; active methylenes such as dimethyl malonate, diethyl malonate, ethyl acetoacetate, methyl acetoacetate, acetylacetone and the like; mercaptans such as butyl mercaptan, t-butyl mercaptan, hexyl mercaptan, t-dodecyl mercaptan, 2-mercaptobenzothiazole, thiophenol, methylthiophenol, ethylthiophenol and the like; acid amides such as acetanilide, acetanisidide, acetotoluide, acrylamide, methacrylamide, acetic acid amide, stearic acid amide, benzamide and the like; imides such as succinimide, phathalimide, maleimide and the like; amines such as diphenylamine, phenylnaphthylamine, xylidine, N-phenylxylidine, carbazole, aniline, naphthylamine, butylamine, dibutylamine, butylphenylamine and the like; imidazoles such as imidazole, 2-ethylimidazole and the like; ureas such as urea, thiourea, ethyleneurea, ethylenethiourea, diphenylurea and the like; carbamic acid esters such as phenyl N-phenylcarbamate; imines such as ethyleneimine, propyleneimine and the like; and sulfites such as sodium disulfite, potassium disulfite and the like.

In the first clear paint, the polyisocyanate compound is preferably used at such an amount as will render the equivalent ratio (NCO/OH) between the hydroxy groups in the hydroxyl-containing resin and the isocyanate groups in the polyisocyanate compound (where it is a blocked polyisocyanate compound, the total of blocked isocyanate groups and unblocked isocyanate groups), within a range of generally 0.3-2.0, in particular, 0.4-1.6, inter alia, 0.5-1.2, for good curability and stability of the first clear paint.

As the crosslinking component, melamine resin may be concurrently used in addition to the polyisocyanate compound, where necessary.

Examples of concurrently useful melamine resin include methylolmelamines such as dimethylolmelamine, trimethylolmelamine, tetramethylolmelamine, pentamethylolmelamine and hexamethylolmelamine; alkyletherified products of methylolmelamine with alcohol; etherified products of methylolmelamine condensate with alcohol, and like. As the alcohol, for example, methyl alcohol, ethyl alcohol, propyl alcohol, isopropyl alcohol, butyl alcohol, isobutyl alcohol, 2-ethylhexyl alcohol and the like can be used.

As the melamine resin, for example, melamine resin having at least three methyletherified methylol groups per one triazine nucleus on the average; hydrophilic imino group-containing alkyletherified melamine resin having a weight-average molecular weight of about 500-about 1,000; and the like can be conveniently used.

As the melamine resin, those available on the market can also be used. As such, for example, CYMEL 303, CYMEL 323, CYMEL 325, CYMEL 327, CYMEL 350, CYMEL 370, CYMEL 380, CYMEL 385 and CYMEL 254 (tradename, Nippon Cytec Industries); REGIMIN 735, REGIMIN 740, REGIMIN 741, REGIMIN 745, REGIMIN 746 and REGIMIN 747 (tradename, Monsanto Chemical Co.); SUMIMAL M55, SUMIMAL M30W and SUMIMAL M50W (tradename, Sumitomo Chemicals); U-VAN20SE (tradename, Mitsui Chemicals); and the like can be named.

These melamine resins can be used either alone or in combination of two or more.

When melamine resin is co-used, its preferred use ratio is generally no more than 40 mass %, in particular, 1-30 mass %, inter alia, 5-20 mass %, based on 100 mass parts of the combined hydroxyl-containing resin and polyisocyanate compound.

The first clear paint can contain organotin compound as curing catalyst.

Furthermore, when melamine resin is co-used as crosslinking agent, sulfonic acid such as paratoluenesulfonic acid, dodecylbenzenesulfonic acid and dinonylnaphthalenesulfonic acid; neutralized salt of the sulfonic acid with amine; and neutralized salt of phosphoric acid ester compound with amine; and the like can be used as curing catalyst.

The first clear paint can further contain, where necessary, such additives as UV absorber, light stabilizer, antioxidant, surface regulating agent, defoaming agent, rheology controlling agent and the like.

As the UV absorber, those known per se can be used, e.g., benzotriazole-type absorber, triazine-type absorber, salicylic acid derivative-type absorber or benzophenone-type absorber.

Preferred content of such a UV absorber in the first clear paint in respect of weatherability and yellowing resistance is, per 100 mass parts of the total solid resin content, within a range of normally 0-10 mass parts, in particular, 0.2-5 mass parts, inter alia, 0.3-2 mass parts.

Here the total solid resin content refers to the total solid content of the hydroxyl-containing resin, polyisocyanate compound, and the melamine resin which is optionally used where necessary.

As the light stabilizer, those known per se can be used, as examples of which hindered amine type light stabilizers can be named.

Preferred content of such a light stabilizer in the first clear paint in respect of weatherability and yellowing resistance is, per 100 mass parts of the total solid resin content, within a range of normally 0-10 mass parts, in particular, 0.2-5 mass parts, inter alia, 0.3-2 mass parts.

The first clear paint may also contain coloring pigment, extender, effect pigment or the like, in an amount within a range not interfering transparency of its coating film.

The form of the first clear paint is not particularly limited, and it may be either water-based or organic solvent-based. When it is made organic solvent-based, various organic solvents for paint, e.g., aromatic or aliphatic hydrocarbon solvents; ester solvents; ketone solvents; and ether solvents can be used. The solvent which was used at the preparation time of the hydroxyl-containing resin to be blended may be used in situ, or a solvent may be suitably added.

In the first clear paint, the crosslinking reaction between free isocyanate groups in the polyisocyanate compound and hydroxyl groups in the hydroxyl-containing resin easily takes place at ambient temperature. Hence when a polyisocyanate compound containing free isocyanate groups is used as the crosslinking agent, preferably the hydroxyl-containing resin and the polyisocyanate compound are separated advancedly as two package coat, and mixed immediately before application. In that case, it is generally desirable that UV absorber, light stabilizer and other additives that are optionally used where necessary are blended in the hydroxyl-containing resin package. The mixing can be effected with per se known mixing device, such as rotary blade stirrer, agitator, homogenizer or the like.

The first clear paint which can form a coating film having a glass transition temperature of less than 70° C. and tan δ at 80° C. of less than 0.4, in the dynamic viscoelasticity measurement at a frequency of 11 Hz of the coating film of 40 μm in thickness after being cured by heating at 140° C. for 30 minutes, can be obtained by: for example, using as the hydroxyl-containing resin, an acrylic resin having relatively low Tg within a range of from −60° C. to 30° C., which is produced using as copolymerization component a soft monomer, for example, hydroxyl-containing vinyl monomer having long chain hydroxyl-containing hydrocarbon group such as 4-hydroxybutyl(meth)acrylate, or monoesterified product of acrylic acid or methacrylic acid with monohydric alcohol having long chain hydrocarbon group, such as 2-ethylhexyl (meth)acrylate, lauryl(meth)acrylate or the like; and as the polyisocyanate compound, aliphatic polyisocyanate, alicyclic polyisocyanate or derivatives thereof which either contains in its isocyanate skeleton (at a part thereof) a soft chain structure or which is at least trifunctional and a soft structured component is bound to at least one of the functional group sites.

The Second Clear Paint

The second clear paint which is used in the multilayer coating film-forming method of the present invention comprises hydroxyl-containing resin and polyisocyanate compound and which can form a coating film having a glass transition temperature of at least 70° C., the temperature at which tan δ (loss elastic modulus/storage elastic modulus) marks the maximum value in the measurement of the dynamic viscoelasticity at a frequency of 11 Hz of the second clear coating film of 40 μm in thickness as formed by curing the applied paint by heating at 140° C. for 30 minutes.

The second clear paint is a clear paint for forming a coating film layer functioning for stain resistance, acid resistance and scratch resistance of the multilayer coating film, as the upper layer thin, hard coating film of the multilayer coating film formed by the multilayer coating film-forming method of the present invention.

The second clear paint furthermore is applied to provide a thin second clear coating film having a thickness after heat-curing within a range of 2-15 μm, preferably 4-13 μm, to render the scratch resistance (damage restorability) and stain resistance of the multilayer coating film compatible.

The second clear paint is subject to no particular limitation, so long as it comprises hydroxyl-containing resin and polyisocyanate compound and is capable of forming a coating film whose glass transition temperature in the aforesaid dynamic viscoelasticity measurement is not lower than 70° C. The hydroxyl-containing resin and the polyisocyanate compound can be suitably selected from those enumerated as being useful for the first clear paint. Whereas, because those which can form high Tg and hydrophobic coating film are advantageous for effective expression of above functions, hydroxyl-containing acrylic resin is preferred as the hydroxyl-containing resin.

The hydroxyl-containing acrylic resin preferably has a hydroxyl value within a range of generally 120-300 mgKOH/g, in particular, 130-250 mgKOH/g, inter alia, 130-200 mgKOH/g, from the viewpoint of curability and scratch resistance; and also from the viewpoint of pot life and curability, an acid value within a range of generally 0-50 mgKOH/g, in particular 0-35 mgKOH/g, inter alia, 0-25 mgKOH/g.

The hydroxyl-containing acrylic resin also preferably has a number-average molecular weight within a range of generally 2,000-50,000, in particular, 2,500-40,000, inter alia, 3,000-30,000, from the viewpoint of finished appearance and weatherability.

The hydroxyl-containing acrylic resin preferably has a relatively high glass transition temperature within a range of from −30° C. to 70° C., in particular, from −20° C. to 60° C., inter alia, from −10° C. to 50° C., for the necessity for the second clear paint to form the 40 μm-thick second clear coating film upon application and heat-curing, which has a glass transition temperature of at least 70° C. when its dynamic viscoelasticity is measured at a frequency of 11 Hz.

For obtaining the hydroxyl-containing acrylic resin having the Tg within the above-specified preferred range, for example, it is desirable to use, among the above-exemplified monomeric component, hard monomers such as styrene, methyl methacrylate, isobornyl(meth)acrylate and the like. In particular, for favorable acid resistance and stain resistance, use of isobornyl(meth)acrylate is preferred.

From the viewpoint of scratch resistance, it is preferred to use as the hydroxyl-containing monomer, one having at least $C_4$ long chain hydroxyalkyl group, more specifically, for example 4-hydroxybutyl(meth)acrylate, BLENMER PP-1000 (tradename, NOF Corporation, polypropylene glycol monomethacrylate monomer) and the like. Hydroxyl-containing monomers having cyclohexyl skeleton can also be conveniently used, specific examples including CHDMMA (tradename, Nippon Kasei Co., 1,4-cyclohexanedimethanol monoacrylate) and the like.

Again from the viewpoint of scratch resistance, monomers having alkoxysilyl group can also be conveniently used, specific examples including vinyltrimethoxysilane, vinyltriethoxysilane, acryloxyethyltrimethoxysilane, methacryloxyethyltrimethoxysilane, acryloxypropyltrimethoxysilane, methacryloxypropyltrimethoxysilane, acryloxypropyltriethoxysilane, methacryloxypropyltriethoxysilane, vinyltris(β-methoxyethoxy)silane and the like. Of these, vinyltrimethoxysilane, γ-acryloxypropyltrimethoxysilane and γ-methacryloxypropyltrimethoxysilane can be used as preferred alkoxysilyl-containing unsaturated monomers.

Further from the viewpoint of scratch resistance, acrylic monomers having long chain secondary hydroxyl groups, which are synthesized by adding acid anhydride of dicarboxylic acid to hydroxyl-containing acrylic monomer and further reacting the carboxyl group in the resulting adduct with epoxy group in monoepoxy compound, can also be conveniently used.

Examples of the hydroxyl-containing acrylic monomer to be used in the above reaction include $C_{2-10}$ primary hydroxyalkyl esters of (meth)acrylic acid, such as 2-hydroxyethyl(meth)acrylate, 3-hydroxypropyl(meth)acrylate, 4-hydroxybutyl(meth)acrylate, 5-hydroxypentyl(meth)acrylate, 6-hydroxyhexyl(meth)acrylate, 7-hydroxyheptyl(meth)acrylate, 8-hydroxyoctyl(meth)acrylate, 9-hydroxynonyl(meth)acrylate, 10-hydroxydecyl(meth)acrylate and the like. Of these, from the viewpoint of scratch resistance, 2-hydroxyethyl(meth)acrylate and 4-hydroxybutyl(meth)acrylate are preferred.

As the anhydride of dicarboxylic acid, anhydrides of such dicarboxylic acids as hexahydrophthalic acid, succinic acid, pimellic acid, maleic acid fumaric acid and the like can be named. These dicarboxylic anhydrides can be used either alone or in combination of two or more. Of these, succinic anhydride and hexahydrophthalic anhydride can be advantageously used because of good scratch resistance and stain resistance.

The addition reaction of the hydroxyl-containing acrylic monomer with dicarboxylic anhydride can be carried out by half esterification reaction. The optimum temperature of the half esterification reaction varies depending mainly on the melting point of the dicarboxylic anhydride used. For example, when hexahydrophthalic anhydride is used as the acid anhydride, it is about 100-about 180° C. Where necessary, furthermore, a catalyst may be used in the half esterification reaction.

The addition reaction can be effected by reacting hydroxyl-containing acrylic monomer with dicarboxylic anhydride at equimolar ratio, whereby the desired product can be obtained.

The monoepoxy compound contains one epoxy group per molecule, examples of which include monoglycidyl ether compound, monoglycidyl ester compound and the like. Examples of the monoglycidyl ether compound include methylglycidyl ether, butylglycidyl ether, 2-ethylhexylglycidyl ether, sec-butylphenylglycidyl ether, 2-methyloctylglycidyl ether, octadecylglycidyl ether, phenylglycidyl ether, tolylglycidyl ether, octylphenylglycidyl ether and the like. Examples of the monoglycidyl ester compound include glycidyl ester compounds of monovalent carboxylic acids such as acetic acid, propionic acid butyric acid, valeric acid, caproic acid, enanthic acid, caprylic acid, pelargonic acid, 2-ethylhexylic acid, neodecanoic acid, capric acid, undecanoic acid, lauric acid, tridecanoic acid, myristic acid, palmitic acid, isostearic acid, stearic acid, 12-hydroxystearic acid, benzoic acid, toluilic acid and the like.

Of the above-named monoepoxy compounds, 2-ethylhexylglycidyl ether and glycidyl ester compound of neodecanoic acid can be advantageously used from the viewpoints of scratch resistance and finished appearance.

The addition reaction of the hydroxyl-containing acrylic monomer-dicarboxylic anhydride adduct with monoepoxy compound can be easily carried out by reacting carboxyl group in the adduct with epoxy group of the monoepoxy compound.

This addition reaction can be performed by mixing the hydroxyl-containing acrylic monomer-dicarboxylic anhydride adduct with the monoepoxy compound, and reacting them at temperatures of about 100-about 150° C. for around 1-10 hours. In that occasion, organic solvent may be further added where necessary.

In the above addition reaction, moreover, catalyst may be used where necessary. Specific examples of the catalyst effective for the crosslinking reaction of carboxyl group with epoxy group include quaternary salt catalysts such as tetraethylammonium bromide, tetrabutylammonium bromide, tetraethylammonium chloride, tetrabutylphosphonium bromide and triphenylbenzylphosphonium chloride; and amines such as triethylamine and tributylamine. Of these, quaternary salt catalysts are preferred.

The hydroxyl-containing acrylic monomer-dicarboxylic anhydride adduct and the monoepoxy compound are reacted at such a ratio to render the carboxyl groups in the adduct equimolar to the epoxy groups in the monoepoxy compound, to provide the intended adduct. In actual synthesizing reaction, it is preferred to use a slightly excessive amount of the hydroxyl-containing acrylic monomer-acid anhydride adduct, because many hours are required for such an equimolar reaction. Specifically, it is preferable to react them such that the molar ratio of the hydroxyl-containing acrylic monomer-dicarboxylic anhydride adduct/monoepoxy compound should fall within a range of 1/1-1.2/1.

In respect of production efficiency, the reaction between the hydroxyl-containing acrylic monomer-dicarboxylic anhydride adduct and monoepoxy compound may be carried out simultaneously with copolymerization reaction of the acrylic resin. In specific practice, the monoepoxy compound is fed in a reaction vessel together with suitably added solvent in advance, and after raising its temperature to a prescribed copolymerization temperature, a mixture of the hydroxyl-containing acrylic monomer-dicarboxylic anhydride adduct, other copolymerizable unsaturated monomer and polymerization initiator is dropped thereinto to simultaneously carry out the copolymerization reaction and the addition reaction of carboxyl groups in the hydroxyl-containing acrylic monomer-dicarboxylic anhydride adduct with epoxy groups in the monoepoxy compound.

The polyisocyanate compound which is the crosslinking agent component in the second clear paint can be suitably selected from those exemplified in connection with the first clear paint. Whereas, use of polyisocyanate compound of high isocyanate concentration is preferred for having it exhibit the earlier described function.

Specifically, from the viewpoints of scratch resistance and curability, use of polyfunctional polyisocyanate compound having at least three isocyanate groups per molecule such as isocyanurate, as the polyisocyanate compound is preferred.

As such polyisocyanate compound, for example, SUMIDUR N-3300 (tradename, Sumika Bayer Urethane Co., Ltd., trifunctional HMDI isocyanurate), DURANATE TPA-100 (tradename, Asahi Chemical Industry Co., Ltd., trifunctional HMDI isocyanurate) and the like can be named.

The second clear paint preferably contains the hydroxyl-containing resin and the polyisocyanate compound at such ratios that the equivalent ratio (NCO/OH) between hydroxyl groups in the hydroxyl-containing resin and isocyanate groups in the polyisocyanate compound should fall within a range of normally 0.5-2.0, in particular, 0.65-1.75, inter alia, 0.8-1.5, for excellent curability and paint stability.

The second clear paint can contain organotin compound as a curing catalyst.

The second clear paint can also contain, similarly to the case of the first clear paint, additives such as UV absorber, light stabilizer, antioxidant, surface regulating agent, defoaming agent and rheology controlling agent; coloring pigment, extender and the like.

The form of the second clear paint is not particularly limited, and it may be either water-based or organic solvent-based. When it is made organic solvent-based, various organic solvents for paint, e.g., aromatic or aliphatic hydrocarbon solvents; ester solvents; ketone solvents; and ether solvents can be used. The solvent which was used at the preparation time of the hydroxyl-containing resin to be blended may be used in situ, or a solvent may be suitably added.

In the second clear paint, crosslinking reaction between free isocyanate groups in the polyisocyanate compound and hydroxyl groups in the hydroxyl-containing resin easily takes place at ambient temperature. Hence when a polyisocyanate compound containing free isocyanate groups is used as the crosslinking agent, preferably the hydroxyl-containing resin and the polyisocyanate compound are separated advancedly as two package coat, and mixed immediately before application. In that case, it is generally desirable that UV absorber, light stabilizer and other additives that are optionally used where necessary are blended in the hydroxyl-containing resin package. The mixing can be effected with per se known mixing device, such as rotary blade stirrer, agitator, homogenizer or the like.

The second clear paint which can form a coating film having a glass transition temperature of no lower than 70° C. in the dynamic viscoelasticity measurement at a frequency of 11 Hz of the coating film cured by heating at 140° C. for 30 minutes, can be obtained by: using as the hydroxyl-containing resin, an acrylic resin having relatively high Tg within a range of from −30° C. to 70° C., which is produced using as copolymerization component a hard monomer such as styrene, methyl methacrylate, isobornyl(meth)acrylate and the like; and as the polyisocyanate compound, polyisocyanate compound having at least three isocyanate groups per molecule or derivatives thereof.

Measurement of Dynamic Viscoelasticity of Coating Film

Dynamic viscoelasticity characteristics possessed by a coating film is an important factor for scratch resistance of the coating film. Dynamic viscoelasticity of a coating film can be measured generally by giving periodic microstrains to the coating film and measuring its responses thereto. When periodic strains are given to a coating film, if it were a perfect elastic body, it shows no time lag in its responses which appear in phase, but when a viscosity factor is present, lag occurs in the responses.

This strain and stress with time lag are expressed on complex plane as complex elastic modulus E*. The real part E' stands for elastic term (storage elastic modulus), imaginary part E" stands for viscouse term (loss elastic modulus), and their ratio (viscous term/elastic term) is tan δ (loss tangent), i.e., $E^*=E'+iE''$, tan $δ=E''/E'$.

Glass transition temperature of a coating film is a temperature indicating the inflection point from glass region to rubber region, and in the present specification the temperature at which the tan δ value becomes the maximum in the dynamic viscoelasticity (11 Hz, temperature-distributed measurement) is the glass transition temperature (Tg). In general, hardness of coating film correlates with its glass transition temperature.

In the multilayer coating film formed by the multilayer coating film-forming method of the present invention, the glass transition temperature of the first clear coating film is made not higher than 70° C. and its tan δ at 80° C., less than 0.4, when dynamic viscoelasticity is measured at a frequency of 11 Hz as to the first clear coating film having a thickness of 40 μm after cured by heating. Whereby a multilayer coating film excelling in restorability of damages can be formed.

The tan δ at 80° C. of the first clear coating film preferably is at least 0.01 but less than 0.4, in particular, 0.05-0.35, inter alia, 0.1-0.3, for favorable damage restorability and curability.

Also the glass transition temperature of the first clear coating film preferably is at least 20° C. but less than 70° C., in particular, at least 30° C. but less than 70° C., inter alia, at least 40° C. but less than 70° C., in dynamic viscoelasticity measurement at a frequency of 11 Hz, for favorable damage restorability and curability.

From the standpoint of stain resistance and scratch resistance, higher coating film hardness, i.e., higher glass transition temperature, is advantageous. In the multilayer coating film formed by the multilayer coating film-forming method of the present invention, by rendering the glass transition temperature of the second clear coating film having the heat-cured thickness of 40 μm at least 70° C. in its dynamic viscoelasticity measurement at a frequency of 11 Hz, a multilayer coating film excelling in stain resistance, acid resistance and scratch resistance can be obtained.

The glass transition temperature of the second clear coating film preferably is within a range of generally 70-130° C., in particular, 70-120° C., inter alia, 70-110° C., in consideration of stain resistance, scratch resistance and weatherability.

Also G" (loss elastic modulus) at 100° C. of the second clear coating film preferably is within a range of generally $1.0\times10^6$ Pa-$1.0\times10^8$ Pa, in particular, $3.0\times10^6$ Pa-$5.0\times10^7$ Pa, inter alia, $5.0\times10^6$ Pa-$1.0\times10^7$ Pa, in respect of stain resistance.

In the present specification, dynamic viscoelasticity measurement is conducted, using as the measurement sample a rectangular free film (0.5 cm×2 cm) of 40 μm-thick first clear coating or second clear coating which has been cured by heating at 140° C. for 30 minutes, under the conditions of the temperature rise rate, 3° C./min.; the temperature range, 20-200° C.; and at a frequency of 11 Hz, wherein tan δ value at 80° C. and glass transition temperature (the temperature at which the tan δ value reaches the maximum) are measured.

The measurements of above tan δ values and glass transition temperatures can be done with FT Rheospectra DVE-V4 (tradename, Rheology Co. Ltd., a dynamic viscoelasticity-measuring device).

In studying scratch resistance of a coating film, Young's modulus (modulus of elasticity) of the coating film is important. Young' modulus of a coating film can be measured by exerting strain on the coating film in one direction at a constant rate and observing the linear deformation responsive thereto.

When strain is given to a coating film at a constant rate, the stress and strain exerted on the coating film are proportional and a linear relationship can be drawn when the strain is small, as expressed by an equation, Young's modulus=stress/strain. Measurement of the stress/strain characteristics was made as to the samples same as described in the above, under the conditions of 20° C. in atmospheric temperature and a pull rate of 8 mm/min. The Young's modulus was also calculated from the values at the two points of the strain at 0.001 mm and 0.2 mm, by least-squares method. The above measurements can be conducted with EZ-TEST (Shimazu Seisakujo) as a tensile testing machine.

In general terms, when a coating film has an excessively low Young's modulus, its extent of deformation becomes large when damaged and deep scar(s) are apt to be formed.

The first clear coating film preferably has the Young's modulus within a range of normally 800-10,000 $Kgf/cm^2$, in particular, 900-7,500 $Kgf/cm^2$, inter alia, 1,000-5,000 $Kgf/cm^2$, from the viewpoint of damage restorability.

In the present specification, glass transition temperature of resin is the value measured with a differential scanning calorimeter, and that of coating film is the value measured with a dynamic viscoelasticity measuring device.

Because it is difficult to make a free coating film of resin as a test sample and also because floatation occurs during the measurement, the value statically measured with the differential scanning calorimeter is adopted. By contrast, coating film has a crosslinked structure and hence molecular motion therein is limited and specific heat variation in the vicinity of glass transition temperature is small to render the glass transition temperature measurement with a differential scanning calorimeter difficult. The value obtained by dynamic viscoelasticity measurement conducted by exerting vibration energy from outside, therefore, is adopted.

Formulation of the Paints

The first clear paint and second clear paint can be formulated, in the occasions of their use, by mixing the hydroxyl-containing resin with polyisocyanate compound and optionally added additive(s), and diluting the mixture by adding organic solvent for paint or the like, where necessary, to adjust its viscosity to an adequate value.

The adequate viscosity is, for example, when the viscosity is adjusted with Ford cup viscosimeter No. 4, normally within a range of 20-60 seconds, preferably 25-50 seconds at 20° C. for the first clear paint, and normally 10-60 seconds, preferably 10-40 seconds at 20° C. for the second clear paint.

Also the suitable solid paint concentration levels in the first and second clear paints are: generally within a range of 30-65 mass %, in particular, 35-60 mass % for the first clear patent; and generally within a range of 10-50 mass %, in particular, 10-40 mass %, for the second clear paint.

Multilayer Coating Film-Forming Method

Application means of such first and second clear paints is not particularly limited but can be carried out by customarily practiced means. Specifically, for example, air spray coating, airless spray coating, rotary atomizing coating, curtain coat flow coating or the like can be used, which may be practiced under electrostatic impression, where necessary. As the coating means, particularly rotary atomizing coating under electrostatic impression is preferred. The coating can be effected all at once or dividedly in plural times, until the desired film thickness is obtained.

According to the multilayer coating film-forming method of the present invention, first the first clear paint is applied onto a coating object. The coating object can be any of those described in the foregoing which may have been surface treated, and the surface of the coating object may have been coated with coloring paint or the like which is either cured or uncured.

The coating film thickness of the first clear paint preferably is within a range of normally 15-60 μm, in particular, 20-40 μm, in terms of cured film thickness, from the viewpoints of scratch resistance and finished appearance.

The first clear coating film can be cured by heating normally at about 80-about 180° C., preferably about 100-about 160° C., for around 10-40 minutes. In the occasion of the curing by heating, preheating at temperatures of about 50-about 80° C. for around 3-10 minutes may be given before the heat-curing, where necessary, for promoting volatilization of volatile component such as solvent.

After forming the first clear coating film, the second clear paint is applied onto the coating film. The second clear paint is applied to make the second clear coating film formed thereof have a cured film thickness within a range of 2-15 μm.

At the application time of the second clear paint, the first clear coating film may be either cured or uncured. When the second clear paint is applied onto uncured first clear coating film, heat-curing of the first clear coating film is usually effected concurrently with heat-curing of the second clear coating film. From the viewpoint of reducing number times of heat-curing step, the second clear paint is preferably applied onto uncured first clear coating film.

The coating film thickness of the second clear paint preferably is within a range of generally 2-15 μm, in particular, 2-10 μm, inter alia, 5-8 μm, in terms of cured film thickness, from the viewpoints of scratch resistance and stain resistance.

Also the combined coating film thickness of the first and second clear paints is preferably within a range of generally 25-80 μm, in particular, 35-60 μm, in terms of cured film thickness, from the viewpoints of scratch resistance, stain resistance and finished appearance.

The second clear coating film can be cured by heating normally at about 80-about 180° C., preferably about 100-about 160° C., for around 10-40 minutes. In the occasion of the curing by heating, preheating at temperatures of about 50-about 80° C. for around 3-10 minutes may be given before the heat-curing, where necessary, for promoting volatilization of volatile component such as solvent.

Heat-curing of the first clear paint and second clear paint can be effected with per se known heating means, such as drying oven, e.g., hot air oven, electric oven, infrared ray induction furnace, and the like.

According to the so far described multilayer coating film-forming method of the present invention, urethane-crosslinked multilayer coating film formed of lower layer soft coating film and upper layer thin hard coating film having different physical properties can be obtained, which excels in all of scratch resistance, stain resistance, acid resistance and finished appearance.

Thus, the multilayer film-forming method of the present invention can be particularly advantageously used in top clear coat application for automobiles.

EXAMPLES

Hereinafter the invention is explained more specifically, referring to working Examples and Comparative Examples, it being understood that the invention is not limited to the following Examples only. "Part" and "%" appearing hereafter are by mass, and thickness of coating film is always based on that of cured film.

Production of Hydroxyl-Containing Resin

Production Example 1

A four-necked flask equipped with a stirrer, thermometer, cooling tube and nitrogen gas inlet was charged with 31 parts of ethoxyethyl propionate whose temperature was raised to 155° C. under passing nitrogen gas. When 155° C. was reached, nitrogen gas supply was stopped, and into the flask 20 parts of styrene, 43 parts of 2-ethylhexyl acrylate, 36 parts of 4-hydroxybutyl acrylate, 1 part of acrylic acid and 3 parts of 2,2-di(t-amylperoxy)butane (a polymerization initiator) were added dropwise over 4 hours. After aging the reaction mixture at 155° C. for 2 hours while passing gaseous nitrogen, the mixture was cooled to 100° C. and diluted with 32.5 parts of butyl acetate to provide a solution of hydroxyl-containing resin 1, having a solid content of 60%. The hydroxyl-containing resin 1 had a hydroxyl value of 140 mgKOH/g, acid value of 8 mgKOH/g, number-average molecular weight of 7,500 and glass transition temperature of −30° C. The glass transition temperature of the resin was measured with DSC 220U (differential scanning calorimeter, Seiko Instruments & Electronics, Ltd.). Fifty (50) mg of the test sample was measured out onto a sample dish for exclusive use, dried at 130° C. for 3 hours, and its temperature was raised to 150° C. from −50° C. at a rate of 10° C./min in an inert gas. The temperature at the inflection point of resulting caloric variation curve was recorded as the glass transition temperature of the sample.

Production Examples 2-9

Using the compositions as shown in the following Table 1, the operations of Production Example 1 were repeated to provide solutions of hydroxyl-containing resins 2-9. The property values of each of those hydroxyl-containing resins are shown in Table 1, concurrently with the property values of the hydroxyl-containing resin which was obtained in Production Example 1.

TABLE 1

|  | Production Example No. | | | | | | | | |
|---|---|---|---|---|---|---|---|---|---|
|  | 1 | 2 | 3 | 4 | 5 | 6 | 7 | 8 | 9 |
| Hydroxyl-containing resin | 1 | 2 | 3 | 4 | 5 | 6 | 7 | 8 | 9 |
| styrene | 20 | 20 | 20 | 20 | 20 | 20 | 20 | 20 | 20 |
| 2-ethylhexyl acrylate | 43 |  | 18 | 6 | 10 |  |  | 13 | 30 |
| 2-ethylhexyl methacrylate |  |  | 12 |  | 6 | 20 |  |  |  |
| stearyl methacrylate |  | 37 |  |  |  |  |  |  |  |
| methyl methacrylate |  |  | 20 | 7 |  | 25 |  |  | 5 |
| isobornyl acrylate |  |  |  | 30 | 28 |  | 37 | 23 | 9 |
| 4-hydroxybutyl acrylate | 36 | 42 |  | 36 | 36 |  | 42 |  | 36 |
| 2-hydroxyethyl acrylate |  |  | 29 |  |  | 24 |  | 29 |  |

TABLE 1-continued

| | Production Example No. | | | | | | | | |
|---|---|---|---|---|---|---|---|---|---|
| | 1 | 2 | 3 | 4 | 5 | 6 | 7 | 8 | 9 |
| 2-hydroxyethyl methacrylate | | | | | | 10 | | | |
| γ-methacryloxypropyltrimethoxysilane | | | | | | | | 15 | |
| acrylic acid | 1 | 1 | 1 | 1 | | 1 | 1 | | |
| 2,2-di(t-amylperoxy)butane | 3 | 1.25 | 3 | 3 | 3 | 3 | 3 | 3 | 3 |
| Glass transition temp. (° C.) | −30 | −41 | −5 | 8 | 5 | 20 | 10 | 5 | −22 |
| Number-average molecular weight | 7500 | 12,000 | 7500 | 7500 | 7500 | 7500 | 7500 | 7500 | 7500 |
| Hydroxyl value (mgKOH/g) | 140 | 164 | 140 | 140 | 140 | 160 | 160 | 140 | 140 |
| Acid value (mgKOH/g) | 8 | 8 | 8 | 8 | 0 | 8 | 8 | 0 | 0 |
| Mass solid content (%) | 60 | 60 | 60 | 60 | 60 | 60 | 60 | 60 | 60 |

Formulation of First Clear Paint and Second Clear Paint

Production Examples 10-25

Those hydroxyl-containing resins as obtained in Production Examples 1-9, crosslinking agent and other components were stirred and mixed with a dispersing device at the blend ratios as shown in Tables 2 and 3 to be formulated into paint compositions, to provide the first clear paints 1-1 to 1-10 and the second clear paints 2-1 to 2-6. The compositions of each of the clear paint as shown in the following Tables 2 and 3 are by solid mass ratio of each component. (Note 1) to (Note 7) in the Tables 2 and 3 are identified below.

TABLE 2

| | Production Example No. | | | | | | | | | |
|---|---|---|---|---|---|---|---|---|---|---|
| | 10 | 11 | 12 | 13 | 14 | 15 | 16 | 17 | 18 | 19 |
| First clear paint | 1-1 | 1-2 | 1-3 | 1-4 | 1-5 | 1-6 | 1-7 | 1-8 | 1-9 | 1-10 |
| Hydroxyl-containing resin 1 | 67 | 58 | | 48 | | | 54 | | | |
| Hydroxyl-containing resin 2 | | | 64 | | | | | | | |
| Hydroxyl-containing resin 3 | | | | | 60 | 64 | | 67 | | |
| Hydroxyl-containing resin 4 | | | | | | | | | 64 | 67 |
| SUMIDUR N-3300[note 1] | 33 | 21 | 36 | 16 | | 28 | | 33 | 28 | 33 |
| DURANATE-402-90T[note 2] | | 21 | | 16 | 10 | 8 | 23 | | 8 | |
| TAKENATE D-160N[note 3] | | | | | 30 | | 23 | | | |
| CYMEL 350[note 4] | | | | 20 | | | | | | |
| Nacure 5543[note 5] | | | | 1 | | | | | | |
| TINUVIN 384[note 6] | 2 | 2 | 2 | 2 | 2 | 2 | 2 | 2 | 2 | 2 |
| TINUVIN 292[note 7] | 2 | 2 | 2 | 2 | 2 | 2 | 2 | 2 | 2 | 2 |

[Note 1] SUMIDUR N-3300: tradename, Sumika Bayer Urethane Co., Ltd., a polyisocyanate compound
[Note 2] DURANATE E-402-90T: tradename, Asahi Chemical Industry Co., Ltd., a polyisocyanate compound
[Note 3] TAKENATE D-160N: tradename, Mitsui Chemicals Polyurethanes, Inc., a polyisocyanate compound
[Note 4] CYMEL 350: tradename, Mitsui Cytec Industries Co., a melamine resin
[Note 5] Nacure 5543: tradename, King Industry Co., an amine neutralized dodecylbenzenesulfonic acid
[Note 6] TINUVIN 384: tradename, Ciba Specialty Chemicals Co., a UV absorber
[Note 7] TINUVIN 292: tradename, Ciba Specialty Chemicals Co., a light stabilizer.

TABLE 3

| | Production Example No. | | | | | |
|---|---|---|---|---|---|---|
| | 20 | 21 | 22 | 23 | 24 | 25 |
| Second clear paint | 2-1 | 2-2 | 2-3 | 2-4 | 2-5 | 2-6 |
| Hydroxyl-containing resin 4 | 67 | | | | | |
| Hydroxyl-containing resin 5 | | 67 | | | | |
| Hydroxyl-containing resin 6 | | | 64 | | | |
| Hydroxyl-containing resin 7 | | | | 64 | | |
| Hydroxyl-containing resin 8 | | | | | 67 | |
| Hydroxyl-containing resin 9 | | | | | | 67 |
| SUMIDUR N-3300[note 1] | 33 | 33 | 36 | 36 | 33 | 33 |
| TINUVIN 384[note 6] | 2 | 2 | 2 | 2 | 2 | 2 |
| TINUVIN 292[note 7] | 2 | 2 | 2 | 2 | 2 | 2 |

Dynamic Viscoelasticity Measurement of Coating Film

Each of the first clear paints 1-1 to 1-10 and the second clear paints 2-1 to 2-6 as obtained in Production Examples 10-25 was air spray coated on a tin plate to make its cured film thickness of 40 μm when heat-cured at 140° C. for 30 minutes, and the coating film was peeled off and cut into a free rectangular film piece (0.5×2 cm), which was used as the test sample to be measured of dynamic viscoelasticity.

The dynamic viscoelasticity measurement was carried out by measuring tan δ value at 80° C. and glass transition temperature (the temperature at which the tan δ value becomes the maximum) under the conditions of temperature rise rate, 3° C./min; temperature range, 20-200° C.; and the frequency, 11 Hz. As the dynamic viscoelasticity-measuring device, FT Rheospectra DVE-V4 (tradename, Rheology Co., a dynamic viscoelasticity-measuring device) was used. The results of measuring the glass transition temperature (° C.) and tan δ of cured coating film of each of the first and second clear paints are shown in the following Tables 4 and 5.

Multilayer Coating Film-Forming Method

Examples 1-15 and Comparative Examples 1-8

Each of the first and second clear paints as obtained in the above Production Examples 10-25 was adjusted of its viscosity by addition of butyl acetate, using Ford cup #4. The viscosity of the first clear paints was adjusted to 25 seconds, and that of the second clear paints, to 15 seconds.

Onto a PALBOND #3020 (tradename, Nippon Parkerizing Co., a zinc phosphate treating agent)-applied cold-rolled steel sheet (400×300×0.8 mm in size), ELECRON GT-10 (tradename, Kansai Paint Co., a thermosetting epoxy resin-type cationic electrodeposition paint) was electrocoated to a film thickness of 20 μm, cured by heating at 170° C. for 30 minutes. Then onto the formed coating film TP-65-2 (tradename, Kansai Paint Co., a polyester-melamine resin-type intermediate paint for automobiles, black in color) was air spray coated to a film thickness of 35 μm and cured by heating at 140° C. for 30 minutes. Whereupon an electrocoated and intermediate-coated cold-rolled steel sheet was obtained, which was used as the coating object.

Onto this coating object a water-based base coat WBC 713T #202 (tradename, Kansai Paint Co., an acrylic-melamine resin type top base coat paint for automobiles, black in color) was applied to a film thickness of 15 μm, left to stand for 5 minutes at room temperature and preheated at 80° C. for 10 minutes. Onto the uncured coating film the first clear paint and the second clear paint were successively applied under the conditions as shown in Table 4 (Examples) and Table 5 (Comparative Examples), to form each a multi-layer coating film. After successively applying the first clear paint and second clear paint in differing combinations among those described in Examples and Comparative Examples and the steps as specified in the Tables 4 and 5, the multilayer films were cured by heating at 140° C. for 30 minutes to provide the test panels, which were given the following performance tests.

In the columns of "Steps" in Tables 4 and 5, W/W means that the first clear paint was applied and left to stand at room temperature for 10 minutes, before the second clear paint was applied thereon; PH means that the first clear paint was applied and preheated at 80° C. for 3 minutes before the second clear paint was applied thereon; and Bake means that the first clear paint was applied and cured by heating at 140° C. for 30 minutes, before the second clear paint was applied thereon. The film thickness of the first clear paint was 40 μm, and that of the second clear paint was as shown in Tables 4 and 5.

In the stain resistance test, a white colored intermediate-coated board was prepared as the coating object in the manner similar to the above, except that TP-65-2 (tradename, Kansai Paint Co., a polyester-melamine resin type intermediate paint for automobiles, black in color) was replaced with TP-65-2 (tradename, Kansai Paint Co., a polyester-melamine resin type intermediate paint for automobiles, white in color) and that the first clear paint and second clear paint were successively applied onto the white colored intermediate-coated sheet without the intervening application of the base coat paint, and used as the test panels.

Test Methods

Each of the obtained test panels was allowed to stand at room temperature for 7 days, and thereafter tested of scratch resistance, stain resistance, acid resistance, coated surface smoothness and luster.

Scratch resistance: Automobiles with the test panels stuck on their roofs with waterproof adhesive tape of Nichiban Co., Ltd. were washed with a car-washing machine 15 times at 20° C. The 20° mirror plane reflectivity (20° gloss value) of each of the test panels was measured to determine the gloss retention (%) to its 20° gloss value before the test. The higher the gloss retention, the better the scratch resistance. The car-washing machine used was PO20 FWRC (tradename) of Yasui Sangyo K.K.

Stain resistance: Onto each of the white color-coated test panels, the following staining liquid was uniformly dispersed with a sprayer, and the panels were allowed to stand at 20° C. for 16 hours, followed by 6 hours' drying in a 80° C. dryer. The above series of operations was counted as one cycle and 4 cycles were conducted. Then the panels were mildly washed with a piece of flannel cloth while being wetted with running water, and the degree of staining of the coating film was evaluated by the value difference ($\Delta L^*$) of the coated panel, according to the following criteria, in which $\Delta L^*$ was calculated by the following equation:

$$\Delta L^* = (L^* \text{ value before the staining resistance test}) - (L^* \text{ value after the staining resistance test}).$$

The above $L^*$ value was evaluated by measuring the $L^*$ value based on CIE color-matching function. The measurement was made with Color Guide 45/0 (tradename) of BYK Gardner Co. The less the $\Delta L^*$ value, the better the staining resistance. As a general yardstick, $\Delta L^*$ values less than 1.0 can be deemed to indicate good staining resistance.

The staining liquid was prepared as follows: 0.1 g each of carbon black (JIS test powder, Class 12) and the Kanto loam (JIS test powder Class 8) were added to 100 g of deionized water, and further a suitable amount of 0.1 N aqueous $H_2SO_4$ solution was added to adjust pH of the liquid mixture to 3.

Acid resistance: Onto the coating film on each of the test panels 0.4 cc of 40% sulfuric acid was dropped, heated on a 60° C. hot plate for 15 minutes and washed with water. The etched depth (μm) at the sulfuric acid-dropped spot was measured with a surface roughness meter (SURFCOM 570A, tradename, a surface roughness shape measuring machine by Tokyo Seimitsu Co., Ltd.) under the conditions of cut-off, 0.8 mm (scanning speed, 0.3 mm/sec., magnification, 5,000×) to evaluate the acid resistance. The less the etched depth, the better the acid resistance.

Concurrently, the coated surface condition was observed and visually evaluated according to the following criteria:

◯: no change in the coated surface condition was observed;

x: whitening of the sulfuric acid-dropped spot of the coating surface was observed.

Coated surface smoothness: Short Wave (SW) values were measured with Wave Scan (tradename) of BYK Gardner Co. Short Wave value is an index of amplitude of surface roughness of the wavelength ranging about 300-1200 μm, and can evaluate fine structure of coating film surface. The less the measured Wave Scan value, the better the coated surface smoothness. Generally Wave Scan values less than 10 indicate favorable coated surface smoothness.

Luster: Luster was evaluated by visual observation:

◯: favorable

Δ: less favorable x: inferior.

The above performance test results are shown in the following Tables 4 and 5, concurrently with the result of the dynamic viscoelasticity measurement.

TABLE 4

| | Example No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| First clear paint | 1-1 | 1-2 | 1-3 | 1-4 | 1-5 | 1-6 | | | | | 1-1 | | | | |
| glass transition temperature (° C.) | 53 | 33 | 50 | 55 | 58 | 62 | | | | | 53 | | | | |
| tan δ (80° C.) | 0.09 | 0.04 | 0.07 | 0.31 | 0.33 | 0.35 | | | | | 0.09 | | | | |
| Young's modulus (kgf/cm$^2$) | 3000 | 1000 | 2500 | 4000 | 3800 | 4400 | | | | | 3000 | | | | |
| Second clear paint | | | | 2-1 | | | 2-2 | 2-3 | 2-4 | 2-5 | | | | 2-1 | |
| glass transition temperature (° C.) | | | | 85 | | | 75 | 100 | 100 | 85 | | | | 85 | |
| film thickness (μm) | | | | 6 | | | 6 | 6 | 6 | 6 | 2.5 | 9 | 13 | 6 | |
| Steps | W/W | W/W | W/W | W/W | W/W | W/W | W/W | W/W | W/W | W/W | W/W | W/W | W/W | PH | Bake |
| Scratch resistance (%) | 85 | 83 | 84 | 84 | 81 | 77 | 87 | 80 | 84 | 85 | 90 | 83 | 77 | 83 | 77 |
| Stain resistance ΔL* | 0.3 | 0.5 | 0.3 | 0.2 | 0.2 | 0.2 | 0.5 | 0.8 | 0.1 | 0.1 | 0.3 | 0.3 | 0.2 | 0.3 | 0.2 |
| Acid resistance visual observation | ○ | ○ | ○ | ○ | ○ | ○ | ○ | ○ | ○ | ○ | ○ | ○ | ○ | ○ | ○ |
| Acid resistance depth (μm) | 0.2 | 0.2 | 0.2 | 0.2 | 0.2 | 0.2 | 0.3 | 0.4 | 0.1 | 0.1 | 0.3 | 0.1 | 0.1 | 0.1 | 0.1 |
| Finished appearance (SW value) | 7 | 6 | 7 | 9 | 7 | 7 | 7 | 8 | 8 | 8 | 9 | 7 | 6 | 9 | 6 |
| Luster visual observation | ○ | ○ | ○ | ○ | ○ | ○ | ○ | ○ | ○ | ○ | ○ | ○ | ○ | ○ | ○ |

TABLE 5

| | Example No. | | | | | | | |
|---|---|---|---|---|---|---|---|---|
| | 1 | 2 | 3 | 4 | 5 | 6 | 7 | 8 |
| First clear paint | 1-7 | 1-8 | 1-9 | 1-10 | | 1-1 | | |
| glass transition temperature (° C.) | 33 | 68 | 75 | 89 | | 53 | | |
| tan δ (80° C.) | 0.02 | 0.51 | 0.82 | 0.35 | | 0.09 | | |
| Young's modulus (kgf/cm$^2$) | 500 | 4500 | 8500 | 11000 | | 3000 | | |
| Second clear paint | | | 2-1 | | 2-6 | | 2-1 | |
| glass transition temperature (° C.) | | | 85 | | 59 | | 85 | |
| film thickness (μm) | | | 6 | | 6 | 1.5 | 17 | 20 |
| Steps | W/W | W/W | W/W | W/W | W/W | W/W | W/W | W/W |
| Scratch resistance (%) | 60 | 60 | 55 | 48 | 83 | 78 | 62 | 58 |
| Stain resistance ΔL* | 0.3 | 0.3 | 0.3 | 0.4 | 1.5 | 1.1 | 0.2 | 0.2 |
| Acid resistance visual observation | ○ | ○ | ○ | ○ | ○ | X | ○ | ○ |
| Acid resistance depth (μm) | 0.1 | 0.1 | 0.1 | 0.1 | 0.5 | 0.8 | 0.2 | 0.2 |
| Finished appearance (SW value) | 7 | 7 | 7 | 7 | 6 | 18 | 6 | 7 |
| Luster visual observation | ○ | ○ | ○ | ○ | ○ | X | ○ | ○ |

The invention claimed is:

1. A method for forming a multilayer coating film, comprising applying a first clear paint onto a coating object to form a first clear coating film, applying onto the first clear coating film which is either uncured or cured by heating, a second clear paint to form a second clear coating film such that the second clear coating film has a heat-cured film thickness within a range of 2-15 μm, wherein:
(a) the first clear paint and the second clear paint comprise hydroxyl-containing resin as a base resin and polyisocyanate compound as a crosslinking agent, and
(b) when the first clear paint is applied and cured by heating at 140° C. for 30 minutes to form a first clear coating film having a cured thickness of 40 μm, and a dynamic viscoelasticity of the so formed first clear coating film is measured at a frequency of 11 Hz, the so formed first clear coating film has a glass transition temperature of lower than 70° C. and a tan δ (=loss elastic modulus/storage elastic modulus) at 80° C. of less than 0.4, and when the second clear paint is applied and cured by heating at 140° C. for 30 minutes to form a second clear coating film having a cured thickness of 40 um, and a dynamic viscoelasticity of the so formed second clear coating film is measured at a frequency of 11 Hz, the so formed second clear coating film has a glass transition temperature of at least 70° C.

2. The multilayer coating film-forming method according to claim 1, in which the surface of the coating object is a surface coated with an uncured or cured coating film formed by application of coloring paint.

3. The multilayer coating film-forming method according to claim 1, in which the first clear paint contains, as the hydroxyl-containing resin, hydroxyl-containing acrylic resin or hydroxyl-containing polyester resin.

4. The multilayer coating film-forming method according to claim 1, in which the first clear paint contains, as the hydroxyl-containing resin, a hydroxyl-containing acrylic resin having a glass transition temperature within a range of from −60° C. to 30° C.

5. The multilayer coating film-forming method according to claim 1, in which the first clear paint contains, as the polyisocyanate compound, at least one of aliphatic polyisocyanate, alicyclic polyisocyanate, and derivatives of these polyisocyanates.

6. The multilayer coating film-forming method according to claim 1, in which the second clear paint contains, as the hydroxyl-containing resin, a hydroxyl-containing acrylic resin having a glass transition temperature within a range of from −30 to 70° C.

7. The multilayer coating film-forming method according to claim 1, in which the second clear paint contains polyfunctional polyisocyanate compound having at least three isocyanate groups per molecule.

8. The multilayer coating film-forming method according to claim 1, in which the first clear paint forms a first clear coating film having a glass transition temperature within a range of at least 20° C. but less than 70° C.

9. The multilayer coating film-forming method according to claim 1, in which the first clear paint forms a first clear coating film having the tan$\delta$ at 80° C. within a range of 0.05-0.35.

10. The multilayer coating film-forming method according to claim 1, in which the second clear paint forms a second clear coating film having a glass transition temperature within a range of 70-130° C.

11. The multilayer coating film-forming method according to claim 1, in which the first clear coating film has a Young's modulus within a range of 800-10,000 Kgf/cm$^2$.

12. An article coated by the method as described in claim 1.
13. An article coated by the method as described in claim 2.
14. An article coated by the method as described in claim 3.
15. An article coated by the method as described in claim 4.
16. An article coated by the method as described in claim 5.
17. An article coated by the method as described in claim 6.
18. An article coated by the method as described in claim 7.
19. An article coated by the method as described in claim 8.
20. An article coated by the method as described in claim 9.
21. An article coated by the method as described in claim 10.
22. An article coated by the method as described in claim 11.

* * * * *